United States Patent
Doleschel et al.

(10) Patent No.: US 8,892,366 B2
(45) Date of Patent: Nov. 18, 2014

(54) METHOD OF MEASURING TORQUE AND TORQUE MEASURING SYSTEM FOR SAID METHOD

(75) Inventors: Andreas Doleschel, Grosshelfendorf (DE); Georg Wurzel, Unterhaching (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 704 days.

(21) Appl. No.: 13/113,181

(22) Filed: May 23, 2011

(65) Prior Publication Data

US 2012/0072130 A1 Mar. 22, 2012

(30) Foreign Application Priority Data

Sep. 20, 2010 (EP) .................................. 10400045

(51) Int. Cl.
| | |
|---|---|
| *G01L 1/00* | (2006.01) |
| *G01L 3/00* | (2006.01) |
| *G01L 5/00* | (2006.01) |
| *F16H 59/00* | (2006.01) |
| *F16H 61/00* | (2006.01) |
| *F16H 3/38* | (2006.01) |
| *G01L 3/10* | (2006.01) |
| *G01P 3/48* | (2006.01) |
| *G01M 13/02* | (2006.01) |

(52) U.S. Cl.
CPC . *G01L 3/109* (2013.01); *G01P 3/48* (2013.01); *G01M 13/028* (2013.01)
USPC .......................................... 702/41; 74/336 R

(58) Field of Classification Search
CPC .............. G01P 3/48; G01H 3/00; G01L 3/109
USPC ........................................... 702/41; 74/336 R
See application file for complete search history.

(56) References Cited

U.S. PATENT DOCUMENTS

| | | | |
|---|---|---|---|
| 3,538,762 A | 3/1968 | Parkinson et al. | |
| 5,067,355 A | 11/1991 | Witte | |
| 5,253,531 A * | 10/1993 | Walker et al. | .................... 73/650 |
| 5,265,480 A | 11/1993 | Tsuji et al. | |
| 2003/0131670 A1 | 7/2003 | Lee | |
| 2005/0109141 A1 * | 5/2005 | DeVore et al. | .............. 74/336 R |
| 2009/0211381 A1 * | 8/2009 | Zakrzewski et al. | ......... 73/865.9 |

FOREIGN PATENT DOCUMENTS

| | | |
|---|---|---|
| DE | 10007236 A1 | 8/2001 |
| DE | 10357852 A1 | 8/2005 |
| GB | 617064 A | 2/1949 |
| GB | 1335866 A | 10/1973 |
| WO | 2008088326 A2 | 7/2008 |

OTHER PUBLICATIONS

Search Report and Written Opinion, Application No. EP 10400045; dated Jan. 19, 2011.

* cited by examiner

*Primary Examiner* — John Breene
*Assistant Examiner* — Manuel Rivera Vargas
(74) *Attorney, Agent, or Firm* — Brooks Kushman P.C.

(57) ABSTRACT

A method of measuring torque acting on a drive shaft (13) and a torque measurement system for implementing said method. Vibration sensors (18, 20) are attached to each of said main gearbox (11) and said tail gearbox (15) in order to detect gear mesh vibrations resulting from interaction of said drive shaft (13) with said main gear (12) and said tail gear (16), said detected gear mesh vibrations being transferred to an evaluation unit (19) for analysis.

5 Claims, 3 Drawing Sheets

METHOD OF MEASURING TORQUE AND TORQUE MEASURING SYSTEM FOR SAID METHOD

CROSS-REFERENCE TO RELATED APPLICATION

This application claims the benefit of EP 10 400045.0 filed on Sep. 20, 2010, the disclosure of which is incorporated in its entirety by reference herein.

BACKGROUND OF THE INVENTION (1) Field of the Invention

The invention relates to a method of measuring torque acting on a drive shaft and a torque measurement system for implementing said method. Although the method according to the invention and the measurement system according to the invention can fundamentally be used for a plurality of different applications, their use as a drive shaft torque measurement system, i.e., as a system for determining the torque or rotational moments acting on the tail rotor drive shaft of a helicopter, is presented in detail below. The term "tail gearbox" is to be understood as well as "intermediate gearbox".

(2) Description of the Prior Art

A tail rotor drive shaft between a main gearbox and a tail gearbox of a helicopter is submitted to varying torsional moments depending from the specific flight operation of said helicopter. It is interesting to know the amount and direction of any such torsional moment preferably at any moment.

The torsional moments at a drive shaft in flight operation may be monitored with a measurement system with strain sensors bonded to the drive shaft and signal transmission via a telemetry unit. Such a measurement system has the disadvantages of strain gauges with a limited lifetime, a low reliability of bonding and high additional weight of balance mass and telemetry. For retrofit of said measurement system structural modifications of the helicopter are required with the implied high costs. The telemetry system of said measurement system may cause electromagnetic interference with adjacent control units and thus may be at the origin of hazards and disturbances for the flight operation of such a helicopter.

The document U.S. Pat. No. 5,067,355 (A) discloses a method and an apparatus for determining the power output of a gas turbine engine utilizing a speed sensor coupled to the engine shaft and a signal developed by a pyrometer coupled to the engine turbine for determining engine temperature. A signal from the speed sensor derived from a toothed wheel passing adjacent the sensor is processed to obtain a train of pulse signals representative of angular rotation of the engine shaft. The pyrometer is mounted adjacent at least one of the turbine disks of the engine for detecting instantaneous temperature of each blade of the turbine disk as it passes by the pyrometer. The signal developed by the pyrometer is therefore a signal having peaks corresponding to passage of each blade at the pyrometer. A signal conditioning apparatus processes the signal from the pyrometer to develop a pulse train of shaped signals corresponding to the angular position of each turbine blade as it passes by the pyrometer. The system determines the relative phase difference between the signals developed by the speed sensor and the signals developed on the pyrometer under low load conditions and stores this information as a reference phase difference value. Phase differences under load conditions are thereafter compared to the reference value. The differences in phase are proportional to shaft twist and accordingly to shaft torque. Said method and apparatus are suitable only for a drive shaft with rotating blades.

The document U.S. Pat. No. 5,265,480 (A) discloses first and second magnetic layers respectively fixed in two positions on a peripheral face of a rotary shaft. A magnetizing pattern is preformed at a constant pitch solely on a magnetic face of the first magnetic layer. In a preparatory step, the magnetizing pattern is copied onto a magnetic face of the second magnetic layer, so that a torque detection step is started. In the torque detection step, there is detected phase difference between reproducing signals of two magnetic heads owing to the torsional deformation of the rotary shaft caused by torque. In addition, the number of rotations for a unit time of the rotary shaft is detected based on one of the reproducing signals. Consequently, the applied torque can be obtained by calculation based on the phase difference and the number of rotations for a unit time. The arrangement of specific magnetic layers is not always possible.

The document U.S. Pat. No. 3,538,762 (A) discloses a rotary shaft torque measuring system with a first toothed wheel attached directly to the rotary shaft, a second toothed wheel and transducer means mounted adjacent said toothed wheels for generating alternating signals in response to the rotation of said wheels having a phase displacement indicative of torsional deflection of said shaft. Said rotary shaft torque measuring system is complicated and bulky.

SUMMARY OF THE INVENTION

The object of the invention is to provide an improved method of measuring torque acting on a drive shaft, particularly at a drive shaft of a helicopter's tail drive system, and an improved system for said method of measuring of torque acting on such a drive shaft.

This object is achieved according to the method by claim 1. Claim 3 describes the features of the torque measurement system for implementing the method according to claim 1 of the invention. The dependent claims describe advantageous developments of the invention.

According to the invention a method is presented of measuring torque at a drive shaft, particularly at a helicopter's tail drive system, comprising at least a main gear in a main gearbox, a drive shaft and at least a tail gear in a tail gearbox, said drive shaft being arranged for transmitting torque between said main gear and the tail gear. Said method comprises the following steps: —providing at least two vibration sensors with at least one of said vibration sensors being attached to each of said main gearbox and said tail gearbox, —applying torque to said drive shaft, —acquiring data related to gear mesh vibrations resulting from interaction of said drive shaft with said main gear by means of an at least first vibration sensor of said main gearbox, —acquiring data related to gear mesh vibrations resulting from interaction of said drive shaft with said tail gear by means of an at least second vibration sensor of said vibration sensors, —bandpass filtering separately said separately acquired data from each of said at least one first and second vibration sensors, —extracting phase information from said data filtered separately for each of said first and second vibration sensors, —detecting any delays between the respective phases from the separately extracted phase information for each of said first and second vibration sensors, —computing the rotations per minute for the drive shaft from the extracted phase information from said data filtered separately for each of said first and second vibration sensors, and—computing the torque applied to the drive shaft from the phase difference computed from the separately extracted phase information from each of said first and second vibration sensors. The inventive method allows contactless determination of torque acting on a drive shaft with minimal instrumentation. If said inventive method is applied to a drive shaft of a helicopter's tail drive system said torque measurements may be implemented as an additional function into an onboard "Health and Usage Monitoring System" of a helicopter without any need for extra sensors or hardware. The inventive method of measuring a drive shaft torque allows calculation of the torque of all gears and shafts in a helicopter's drive system.

According to a preferred embodiment of the invention a torque measurement system, particularly for a helicopter's tail drive system, comprises at least a main gear in a main gearbox, a drive shaft and at least a tail gear in a tail gearbox, said drive shaft being arranged for transmitting torque between said main gear and the tail gear. At least two vibration sensors are provided with at least one of said vibration sensors being attached to each of said main gearbox and said tail gearbox in order to detect gear mesh vibrations resulting from interaction of said drive shaft with said main gear and the tail gear, said detected gear mesh vibrations being transferred to an evaluation unit for analysis. The inventive torque measurement system is particularly efficient for a method of measuring torque at a drive shaft and contributes to the development of modern maintenance concepts, particularly modern maintenance concepts of helicopters.

According to a further preferred embodiment of the invention said evaluation unit is provided with data acquiring means, bandpass filtering means, phase extraction means, phase difference and rotations per minute computation means and torque computation means.

According to a further preferred embodiment of the invention said data acquiring means, bandpass filtering means and phase extraction means are respectively provided in parallel for each of said first and second vibration sensors.

As a result of using vibrations as the measure for contactless determination of torque at a drive shaft, advantageously the method according to the invention is independent of ambient conditions such as, e.g., temperature, visibility conditions, moisture, or the like.

The advantage of the inventive embodiment is especially that as a result of the arrangement of the vibration sensors outside of the turning drive shaft, it is no longer necessary to transmit signals from the turning body. Moreover, simplified accessibility of the components is enabled.

BRIEF DESCRIPTION OF THE DRAWINGS

Other advantages, features and possible applications of the invention will become apparent from the following specification in conjunction with the embodiments shown in the drawings. In the drawings.

DETAILED DESCRIPTION OF THE PREFERRED EMBODIMENTS

To avoid repetition, in the following description and in the Figures, the same components are also identified with the same reference numbers if no further differentiation is necessary or useful.

Figure 1:
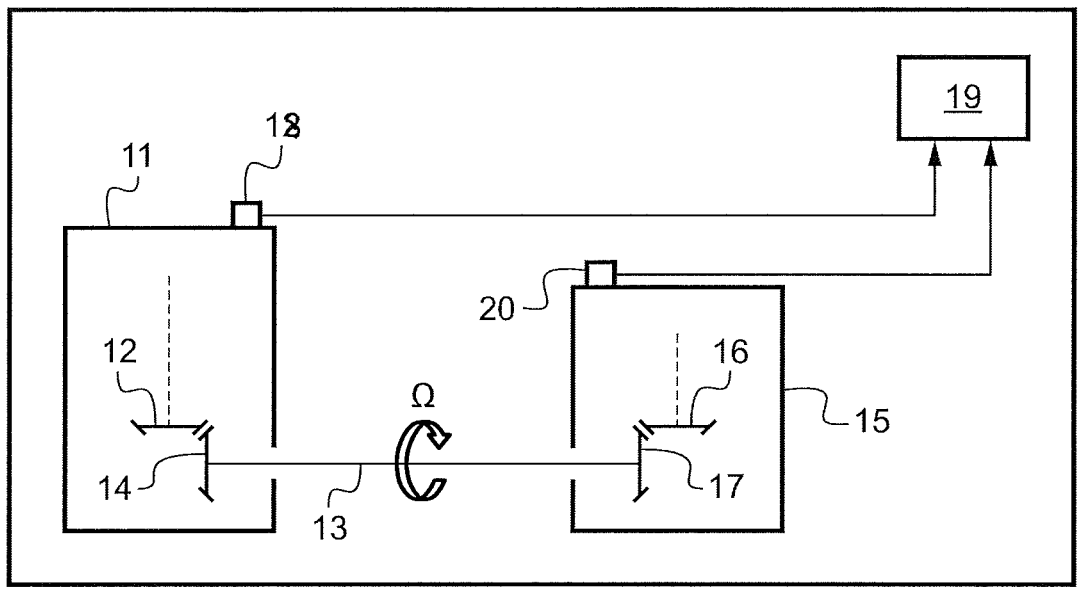
FIG. 1 shows a schematic of a helicopter's tail drive system with a torque measurement system according to the invention.

According to FIG. 1 elements of a schematically shown helicopter's drive system are labelled altogether with reference number 10. For reasons of clarity, an explicit description of the drive system is omitted here. Instead, the elements within the drive system correspond to those of known helicopter's drive systems.

A main gearbox 11 of the drive system comprises essentially a main gear in the form of a bevel shaped tail drive output gear 12 with a number of teeth $z_1$. A drive shaft 13 is provided with a correspondingly bevel shaped first torque wheel 14 engaging fittingly the bevel shaped tail drive output gear 12 and extending through the main gearbox 11 towards a tail gearbox 15. The tail gearbox 15 comprises essentially a tail gear in the form of a bevel shaped aft input gear stage 16 with a number of teeth $z_2$ engaging fittingly a correspondingly bevel shaped second torque wheel 17, driving a tail rotor (not shown).

A first vibration sensor 18 of a torque measurement system is located with direct contact to the outside of the main gearbox 11, said first vibration sensor 18 being connected to an evaluation unit 19. A second vibration sensor 20 of the torque measurement system is located with direct contact to the outside of the tail gearbox 15, said second vibration sensor 20 being as well connected to the evaluation unit 19.

Figure 2:
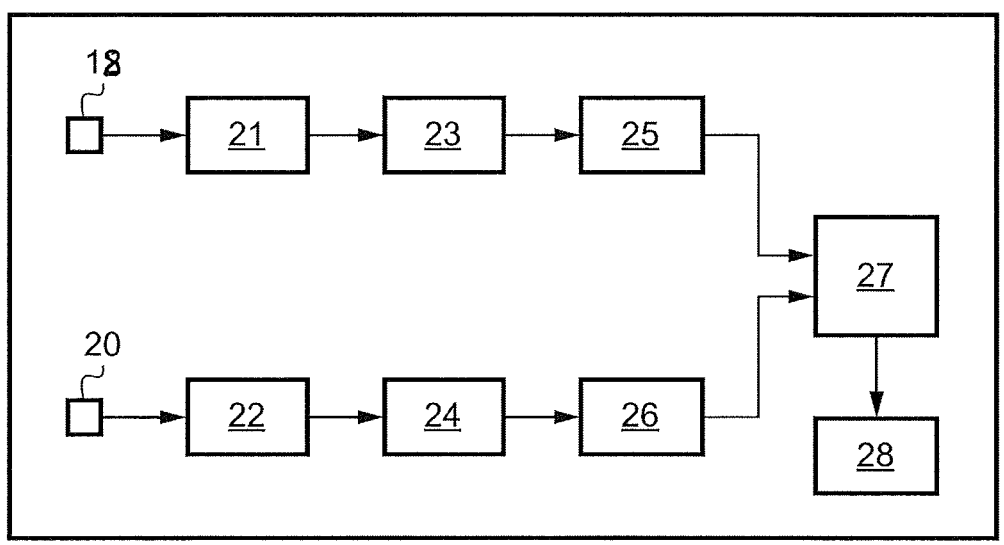
FIG. 2 shows a flow chart of a torque measurement according to the invention.

According to FIG. 2 the evaluation unit 19 is provided with data acquiring means 21, 22, bandpass filtering means 23, 24, phase extraction means 25, 26, phase difference and rotations per minute computation means 27 and torque computation means 28, with said data acquiring means 21, 22, bandpass filtering means 23, 24 and phase extraction means 25, 26 being respectively provided in parallel for each of said first and second vibration sensors 18, 20.

Method of Measuring Torque at a Drive Shaft

For the method of measuring torque at a drive shaft of a helicopter's tail drive system the vibration sensors 18, 20 are attached to each of said main gearbox 11 and said tail gearbox 15. The bevel shaped first torque wheel 14 of the drive shaft 13 engages fittingly the bevel shaped tail drive output gear 12 and the correspondingly bevel shaped second torque wheel 17 of the drive shaft 13 engages fittingly the bevel shaped aft input gear stage 16. Torque is applied to said drive shaft 13 via the main gearbox 11. The interactions of the respective teeth of the bevel shaped first torque wheel 14 with the bevel shaped tail drive output gear 12 and of the bevel shaped second torque wheel 17 with the bevel shaped aft input gear stage 16 create distinct vibrations indicative of torque and rotations per minute applied to said drive shaft 13, said main gearbox 11 and said tail gearbox 15 being at least in some frequency ranges like a cavity resonator for said vibrations. Said distinct vibrations make said first vibration sensor 18 and said second vibration sensor 20 vibrate individually in a way indicative of the specific load and rotational speed of the drive shaft 13 at said main gearbox 11 and said tail gearbox 15. Said distinct vibrations from said first vibration sensor 18 and said second vibration sensor 20 are separately communicated to the evaluation unit 19.

Figure 3:
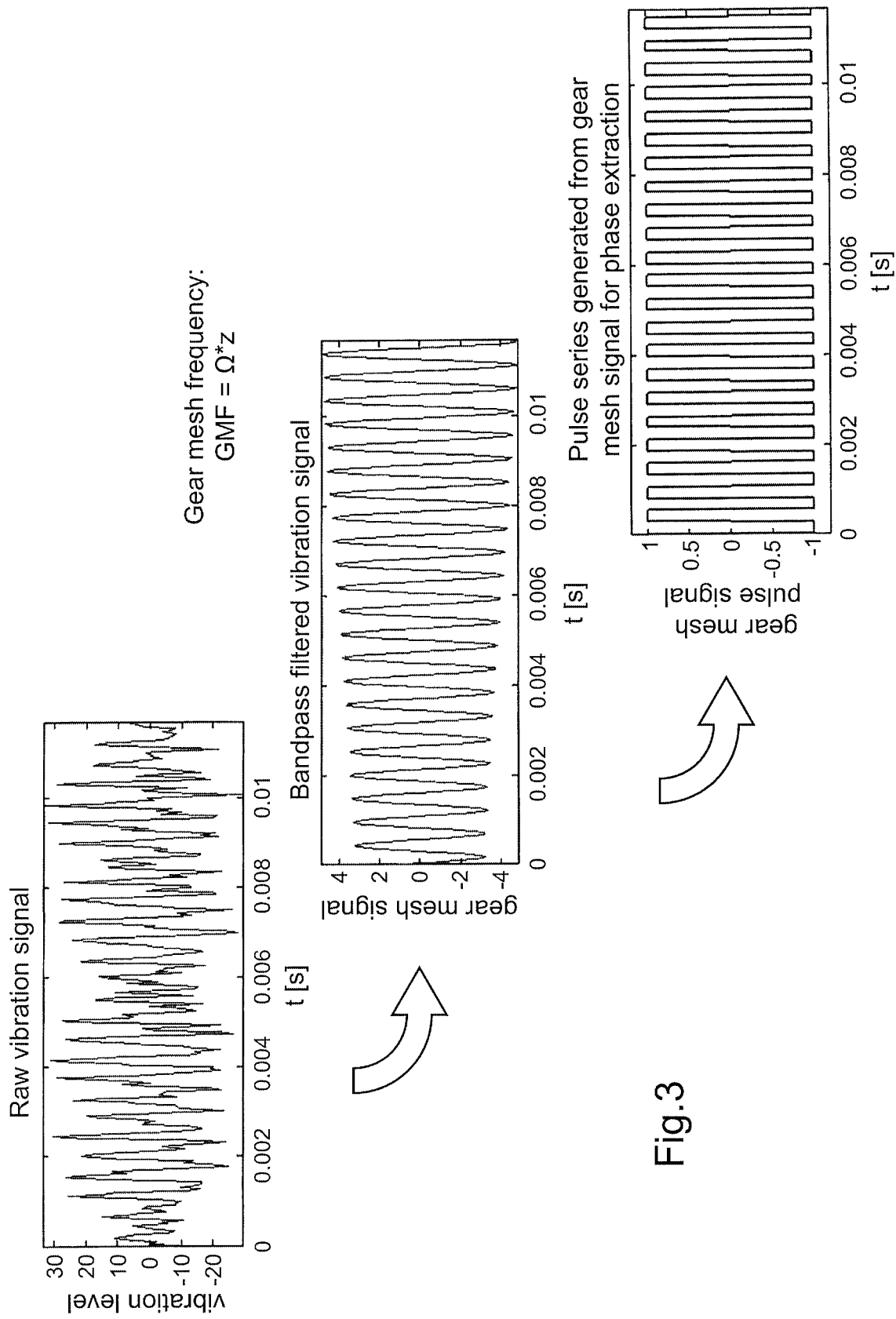
FIG. 3 shows processed data put into graphs according to the starting three steps of FIG. 2.

According to FIG. 3 the data reflecting raw vibration signals of gear mesh vibrations from the at least one first vibration sensor 18 are acquired separately in the evaluation unit 19 by first acquisition means 21 and the data related to gear mesh vibrations from the at least one second vibration sensor 20 are acquired separately in the evaluation unit 19 by second acquisition means 22. Said separately acquired data for each of said first and second vibration sensors 18, 20 are each separately filtered in separate bandpass filtering means 23, 24 of said evaluation unit 19 and separate phase information is extracted in separate phase extraction means 25, 26 from said data filtered separately for each of said first and second vibration sensors 18, 20.

Figure 4:
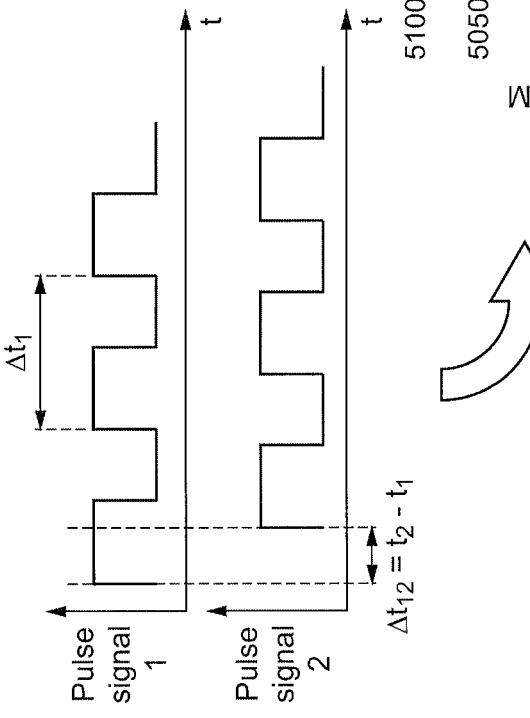
FIG. 4 shows processed data put into graphs according to the final three steps of FIG. 2.
Figure 4:
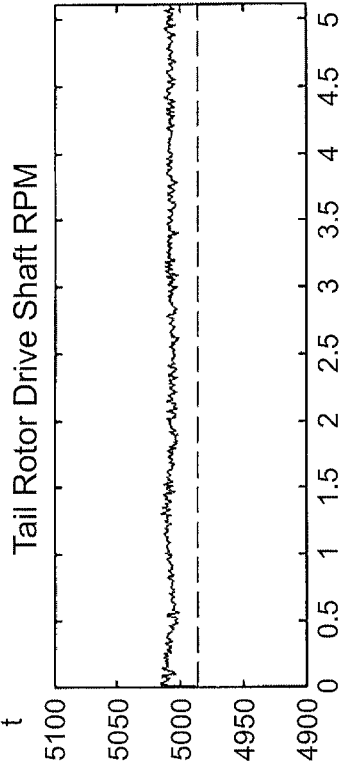
Figure 4:
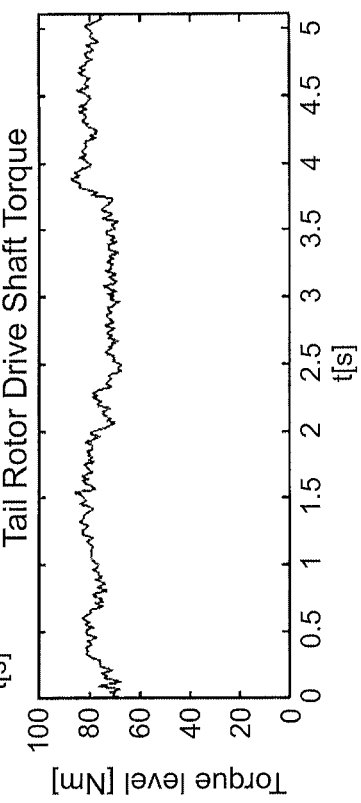

According to FIG. 4 any delays between the respective pulses of the separate series of pulses for each of said first and second vibration sensors are subsequently detected in the common phase difference and rotations per minute computation means 27 from the phase shift between corresponding pulses of said separate first and second series of pulses.

The rotation speed of the drive shaft 13 is computed in the common phase difference and rotations per minute computation means 27 from the pulses of at least one of the series of pulses from said data filtered separately for each of said first and second vibration sensors 18, 20 following the equation:

$$\Omega = \frac{1}{\Delta t1 * z1}$$

The torque applied to the drive shaft 13 is computed by the torque computation means 28 in the evaluation unit 19 from the phase difference from the separately extracted phase information for each of said first and second vibration sensors 18, 20 following the equation:

$$M_T = (\Delta t_{12} - \Delta t_0) * \alpha$$

with said scaling parameter $\alpha$ depending from the torsional stiffness of said drive shaft 13 and an initial phase offset $\Delta t_0$ for the torque computation taking into account a possible phase offset at zero torque.

What is claimed is:

1. A method of measuring torque at a drive shaft of a helicopter drive having at least a main gear in a main gearbox and at least a tail gear in a tail gearbox, said drive shaft being arranged for transmitting torque between said main gear and the tail gear, said method comprising the following steps:
   providing at least first and second vibration sensors with said vibration sensors being respectively attached to each of said main gearbox and said tail gearbox,
   applying torque to said drive shaft,
   detecting main gearbox vibrations related to gear mesh vibrations resulting from interaction of said drive shaft with said main gear by the first vibration sensor attached to said main gearbox vibrating in response to the main gearbox vibrating,
   detecting tail gearbox vibrations related to gear mesh vibrations resulting from interaction of said drive shaft with said tail gear by the second vibration sensor attached to said tail gearbox vibrating in response to the tail gearbox vibrating,
   communicating the main gearbox vibrations detected by the first vibration sensor to an evaluation unit,
   communicating the tail gearbox vibrations detected by the second vibration sensor to the evaluation unit,
   acquiring data related to the main gearbox vibrations related to the gear mesh vibrations communicated from the first vibration sensor to the evaluation unit,
   acquiring data related the tail gearbox vibrations related to the gear mesh vibrations communicated from the second vibration sensor to the evaluation unit,
   bandpass filtering said acquired data for each of said first and second vibration sensors separately,
   extracting separate phase information from said data filtered separately for each of said first and second vibration sensors,
   detecting the phase difference from the separately extracted phase information from each of said first and second vibration sensors,
   computing the rotations per minute for the drive shaft from the extracted phase information from said data filtered separately for each of said first and second vibration sensors, and
   computing the torque applied to the drive shaft from the phase difference computed from the separately extracted phase information for each of said first and second vibration sensors.

2. The method according to claim 1, wherein detecting the phase difference from said separately extracted phase information from said data filtered separately for each of said first and second vibration sensors and computing the torque applied to said drive shaft by applying a scaling parameter to said detected phase difference, said scaling parameter depending from the torsional stiffness of said drive shaft.

3. A torque measurement system for measuring torque at a drive shaft of a helicopter drive having a main gear in a main gearbox and a tail gear in a tail gearbox, said drive shaft being arranged for transmitting torque between said main gear and the tail gear, the system comprising:
   a first vibration sensor attached to the main gearbox and configured to vibrate in response to the main gearbox vibrating to detect main gearbox vibrations related to gear mesh vibrations resulting from interaction of the drive shaft with the main gear while a torque is applied to the drive shaft;
   a second vibration sensor attached to the tail gearbox and configured to vibrate in response to the tail gearbox vibrating to detect tail gearbox vibrations related to gear mesh vibrations resulting from interaction of the drive shaft with said tail gear while the torque is applied to the drive shaft; and
   an evaluation unit configured to acquire data related to the detected main gearbox vibrations from the first vibration sensor and data related to the detected tail gearbox vibrations from the second vibration sensor, bandpass filter the acquired data for each of the first and second vibration sensors separately, extract phase information from the filtered data for each of the first and second vibration sensors, and detect a phase difference from the phase information for each of the first and second vibration sensors;
   the evaluation unit further configured to compute rotations per minute for the drive shaft from the phase information for each of the first and second vibration sensors and to compute the torque applied to the drive shaft from the phase difference.

4. The torque measurement system according to claim 3, wherein said evaluation unit is provided with data acquiring means, bandpass filtering means, phase extraction means, phase difference and rotations per minute computation means and torque computation means.

5. The torque measurement system according to claim 4, wherein said data acquiring means, bandpass filtering means and phase extraction means are respectively provided separately in parallel for each of said first and second vibration sensors.

* * * * *